United States Patent
Liljeback et al.

(10) Patent No.: US 11,281,452 B2
(45) Date of Patent: Mar. 22, 2022

(54) TENANT DECLARATIVE DEPLOYMENTS

(71) Applicant: salesforce.com, inc., San Francisco, CA (US)

(72) Inventors: Eric Liljeback, Dedham, MA (US); Derek Forrest, North Reading, MA (US); Kevin Fairfax, Medford, MA (US); Julian Nodorp, Jena (DE); Martin Hartmann, Uhlstädt-Kirchhase (DE)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/995,380

(22) Filed: Aug. 17, 2020

(65) Prior Publication Data

US 2022/0050670 A1 Feb. 17, 2022

(51) Int. Cl.

| G06F 8/65 | (2018.01) |
|---|---|
| G06F 9/48 | (2006.01) |
| G06F 9/455 | (2018.01) |
| G06F 9/50 | (2006.01) |

(52) U.S. Cl.
CPC ............ *G06F 8/65* (2013.01); *G06F 9/45558* (2013.01); *G06F 9/4881* (2013.01); *G06F 9/5077* (2013.01); *G06F 2009/45591* (2013.01); *G06F 2009/45595* (2013.01)

(58) Field of Classification Search
CPC ...... G06F 8/65; G06F 9/45558; G06F 9/4881; G06F 9/5077; G06F 2009/45591; G06F 2009/45595
See application file for complete search history.

(56) References Cited

U.S. PATENT DOCUMENTS

| 10,715,472 | B2 * | 7/2020 | Gambino | H04L 67/10 |
|---|---|---|---|---|
| 2012/0174085 | A1 * | 7/2012 | Driesen | G06F 8/65 |
| | | | | 717/168 |
| 2015/0347542 | A1 * | 12/2015 | Sullivan | G06F 16/254 |
| | | | | 707/602 |
| 2016/0366233 | A1 * | 12/2016 | Le | H04L 41/0866 |
| 2017/0264684 | A1 * | 9/2017 | Spillane | H04L 67/1095 |
| 2018/0097694 | A1 * | 4/2018 | Raz | G06F 9/5072 |
| 2018/0107252 | A1 * | 4/2018 | Godfrey | G06F 1/162 |
| 2018/0136960 | A1 * | 5/2018 | Zhang | G06F 9/5088 |
| 2019/0334909 | A1 * | 10/2019 | Schmitt | G06F 3/0604 |
| 2021/0004275 | A1 * | 1/2021 | Avagyan | G06F 9/45558 |

OTHER PUBLICATIONS

Gupta et al., "Software as a Service" (Year: 2014).*

* cited by examiner

*Primary Examiner* — Phillip H Nguyen
(74) *Attorney, Agent, or Firm* — Holland & Hart LLP

(57) ABSTRACT

A compute container system may support logical partitions for various single tenant systems. These logical partitions may be referred to as logical single-tenant system stacks. An operator or release manager for a logical partition may identify a declarative deployment file defining a deployment configuration for one or more of a plurality of logical single-tenant system stacks. The operator may determine a deployment schedule for implementing one or more system updates for the plurality of logical single-tenant system stacks based on the declarative deployment file and implement the system updates based on the determined deployment schedule.

20 Claims, 12 Drawing Sheets

TENANT DECLARATIVE DEPLOYMENTS

FIELD OF TECHNOLOGY

The present disclosure relates generally to database systems and data processing, and more specifically to tenant declarative deployments.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support services that may be implemented using a multi-tenant system. However, some services may be implemented on single-tenant systems on a public cloud. Single-tenant systems may be preferred for data privacy and security, as well as to avoid noisy neighbor problems (e.g., a tenant that uses significant resources, which harms other tenants). When a large number of clients are supported using single tenant environments, deployment of updates and upgrades may be difficult due to the various geographical locations of the clients, customers of the clients, client preferences, active versions, etc.

DETAILED DESCRIPTION

Figure 1:
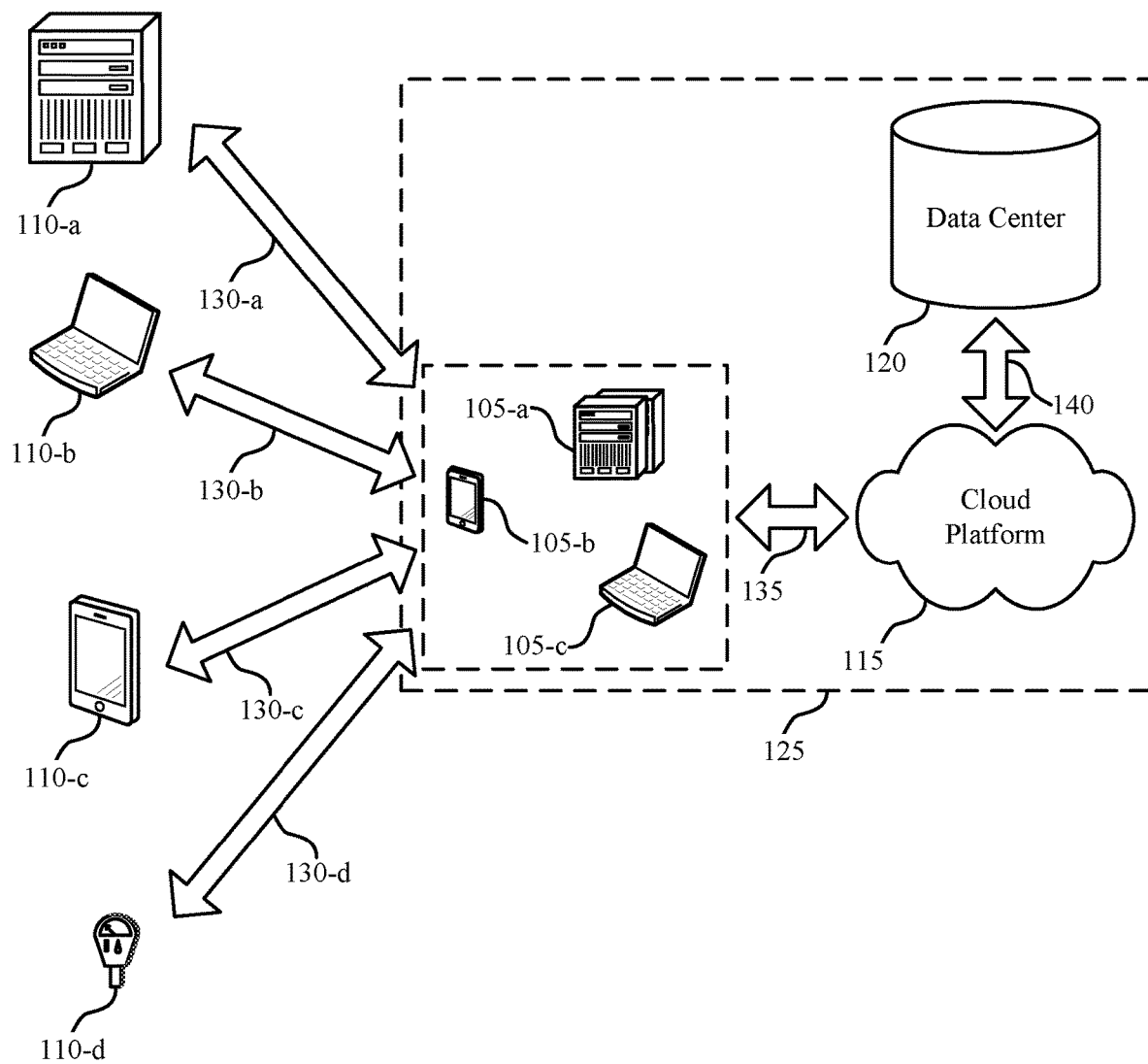
FIG. 1 illustrates an example of a system for software deployment that supports tenant declarative deployments in accordance with aspects of the present disclosure.

Some services may be implemented using a multi-tenant system. However, some services, such as commerce cloud services, may be implemented on single-tenant systems on a public cloud. Single-tenant systems may be preferred for data privacy and security, as well as to avoid noisy neighbor problems (e.g., a tenant that uses more resources may harm another tenant in the multi-tenant system). When a large number of clients are supported using single tenant environments, deployment of updates and upgrades may be difficult due to the various geographical locations of the clients, customers of the clients, client preferences, customer preferences, active versions, etc. For example, upgrading systems during peak or high-volume customer traffic may cause service interruptions and may result in customer dissatisfaction or loss.

Aspects of the disclosure described herein support utilization of a declarative deployment file, which may also be referred to as a release train definition (RTD), that may be used by a software extension referred to as a release manager or operator to schedule and implement software updates (e.g., deployments). A compute container system may be used to support various single-tenant systems, and the compute container system may support logical partitions for each of the single-tenant systems. The logical partition may be referred to as a logical single-tenant system stack that may include one or more application servers, one or more web servers, and one or more databases.

The declarative deployment file may include information such as maintenance windows for each tenant, blackouts or moratoriums, approved application and web versions to be deployed, upgrade paths (e.g., prior version requirements), which realms and instances should be running on which version software, and when. The release manager software extension may consume or reference the declarative deployment file to determine deployment schedules and implement upgrades to various systems and services at the logical single-tenant system stacks.

In some examples, the declarative deployment file identifies the logical single-tenant system stacks using system identifiers included in the declarative deployment file. The deployment manager or an associated system may maintain an association between the system identifiers, which may be associated with a specific tenant, and the corresponding systems that are associated with or are used by the tenant. These system identifiers may also be referred to as realm identifiers, and may be used to identify the physical and logical systems at which the tenant services are hosted. In some examples, the deployment manager may also determine whether respective systems are running active processes before implementing updates in accordance with the declarative deployment file.

The declarative deployment file may also identify whether an update is to be deployed to a test environment (non-production) or a production environment. The deployment manager may implement the updates in accordance with these indications in the declarative deployment file. Further, before the declarative deployment file is consumed by the deployment manager (e.g., operator), the deployment file may be validated using a validation process, as described further herein.

Aspects of the disclosure are initially described in the context of an environment supporting an on-demand database service. Aspects of the disclosure are further described with reference to a general system diagram, a compute cluster node architecture, a deployment process, and a process flow diagram. Aspects of the disclosure are further illustrated by and described with reference to apparatus diagrams, system diagrams, and flowcharts that relate to tenant declarative deployments.

FIG. 1 illustrates an example of a system 100 for cloud computing that supports tenant declarative deployments in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to particular applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, each client 105 or a subset of the clients 105 may be supported in a single-tenant environment. Single-tenant environments may be preferred due to data security concerns, privacy concerns, quality of service concerns, scaling concerns, legal concerns, and the like. The single-tenant environments may be implemented in public cloud systems. The single-tenant environments may be logically separated in the same physical systems, but are logically self-contained. Each single-tenant environment may be referred to as a logical single-tenant system stack. As the cloud platform 115 may support thousands of single-tenant cloud clients 105, deployment updates, patches, and the like to the single-tenant system stacks may be cumbersome and may require consideration of a number of factors such as preferred maintenance windows, versions, and the like.

In multi-tenant systems, the tenants may share database rows, tables, physical and logical storage and data processes, etc. Thus, in multi-tenant environments, system updates may affect each of the multi-tenants simultaneously or contemporaneously. More particularly, because each tenant in a multi-tenant system may share the physical and logical systems, a system update may be pushed to each tenant at the same time. This may lead to predictability and supports regularly scheduled updates. Further, since the system is homogenous, meaning that the system likely has the same versions of services and software for each tenant, the updates may not require version compatibility checks. Thus, system updates may be efficient and streamlined, but may lead to downtime for every tenant at the same time.

Techniques described herein provide for efficient and streamlined deployments in a single-tenant environment. Logical single tenant system stacks (e.g., partitions) may be supported by a compute container system of the cloud platform. A deployment manager (e.g., software extension) of the computer container system may reference a declarative deployment file to implement software updates to one or more of a plurality of logical single-tenant system stacks. The declarative deployment file may include maintenance windows, software compatibility definitions, system identifiers (e.g., realm identifiers), and other information, that defines constraints for deployments within each of the tenant systems. Thus, the deployment manager may identify a deployment schedule for implementing the updates in accordance with the declarative deployment file. Identifying the deployment schedule may include determining which logical single tenant system stacks may be issued the updates and at which times based on the maintenance windows defined in the declarative deployment files. Further, as updates are rolled-out (e.g., implemented), the deployment manager may automatically determine whether a system is running an active process before updating the systems, which may result in fewer service interruptions. Other techniques are described herein to support deploying updates to many logical single-tenant system stacks. When these techniques are leveraged in a public cloud infrastructure and to support thousands of tenants operating in separate environments, computing, memory and processing efficiency may be increased since systems may not be down during peak operating hours, updates may not be deployed to unsupported versions, which may reduce errors and processing inefficiencies.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, the cloud platform 115 supports a commerce system that includes services for supporting e-commerce. The services may include product recommendation services, point of sale services, customer relationship services, logistic services, etc. Tenants of the e-commerce services may prefer that these services be provided in single-tenant environments. These preferences may be due to privacy and/or legal concerns, quality of service requirements, etc. Thus, because the cloud platform 115 supports these services in single-tenant environments, and because the cloud platform 115 may support these services in thousands of single-tenant environments, the techniques described herein provide for a streamlined and automated deployment, which may result in less system downtime and increased processor and memory efficiencies. Further, the updates may be deployed in a maintenance window, which may be defined relative to peak customer activity. Thus, the updates may be deployed in a manner to reduce influence on customer experience.

Figure 2:
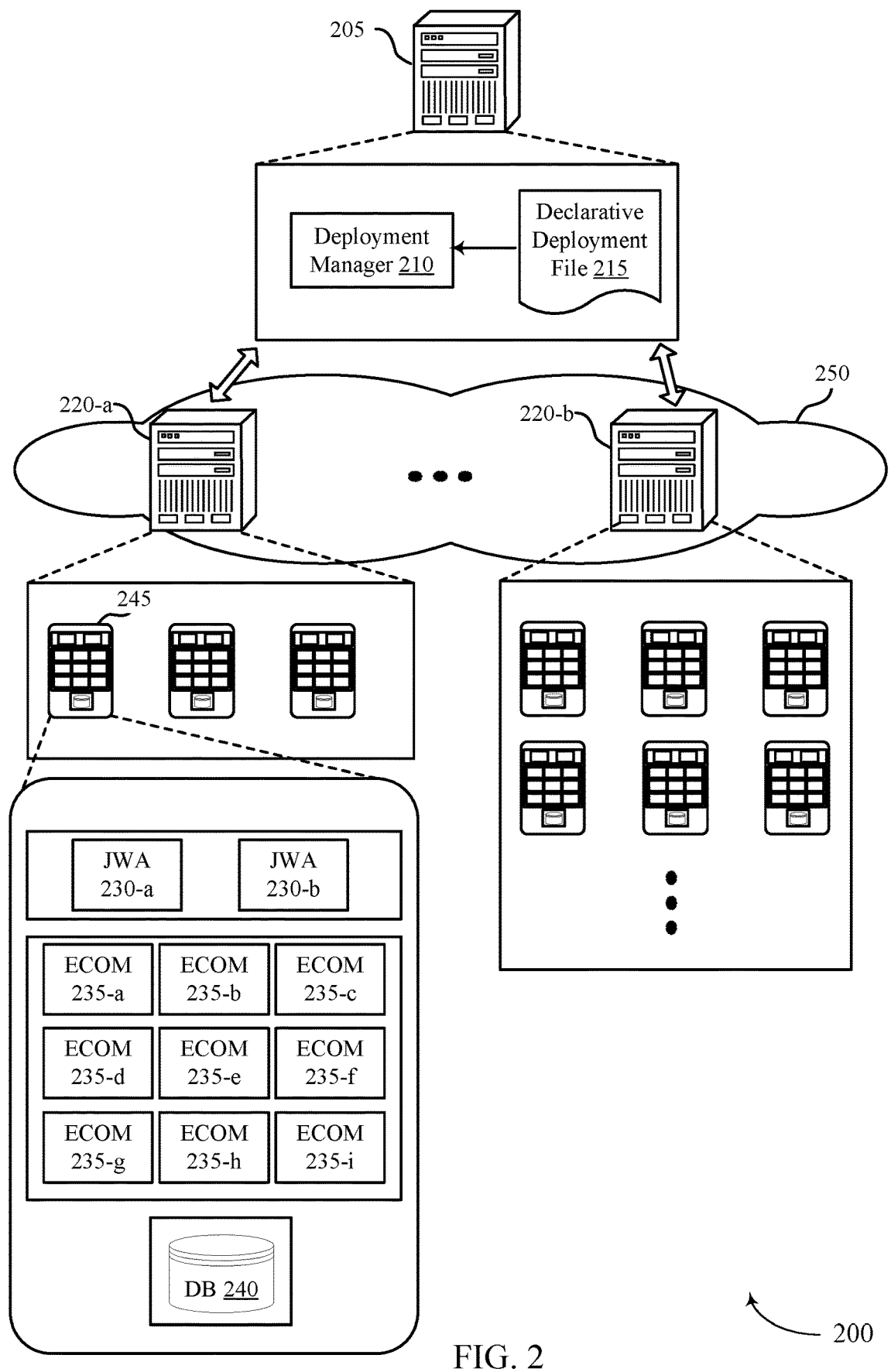
FIG. 2 illustrates an example of a system that supports tenant declarative deployments in accordance with aspects of the present disclosure.

FIG. 2 illustrates an example of a system 200 that supports tenant declarative deployments in accordance with aspects of the present disclosure. The system 200 includes a node 205, which may be an example of aspects of the cloud platform 115 as described with respect to FIG. 1. The system 200 also includes node 220-a and node 220-b, which also may be examples of aspects of the cloud platform 115 of FIG. 1. The nodes 220 may be implemented in a public cloud 250. For example, the nodes 220 may be examples of sets of servers that are implemented in a web services solution provided by a third party. The nodes 220 are illustrated as single servers, but it should be understood that each of the nodes 220 may represent a plurality of physical servers, data storage systems, and the like. The nodes 220 may be geographically separated or co-located in a facility.

Each of the nodes 220 may represent a node of a compute container system such as a Kubernetes system. That is, the nodes 220 may be examples of nodes 220 that handle one or more computing containers in a Kubernetes system. The node 205 may represent a Kubernetes master that communicates with each of the nodes 220 via an application programming interface (API) server. Thus, a systems manager may access the node 205 for various configurations, system monitoring, etc. Each of the nodes 220 may manage a plurality of logical single-tenant system stacks 245. Each of the logical single-tenant system stacks may corresponding to a tenant (e.g., a cloud client 105 of FIG. 1). Thus, the logical single-tenant system stack may be a logical partition of a Kubernetes cluster. The logical single-tenant system stacks may be distributed among servers and nodes 220 based on data throughput at various geographical locations, activity, customer activity, location of the tenant, location of customers, etc.

As described herein, a tenant (e.g., cloud client 105) may prefer single-tenant services over multi-tenant systems for security, privacy, quality of service, etc. As such, each of the logical single-tenant system stacks may be self-contained stack that may be run (e.g., executed) on shared physical blades, hosts, virtual machines, etc. However, the logical single-tenant system stacks may maintain their own processing stack, such as web tiers, table space, oracle processes, application servers, web servers, load balancers, etc. Accordingly, each of the tenants may be independently scaled to support traffic. As illustrated, a logical single-tenant system stack 245 may include a set of application servers 235, which may be examples of single-tenant application servers that support tenant websites (e.g., storefronts). These application servers 235 may support various services for tenants. Further, the logical single-tenant system stack 245 includes a set of web servers 230, which may support ingress and caching for tenant websites (e.g., storefronts). The logical single tenant system stacks 245 may also include database instances 240.

Techniques described herein provide for deployment management using a declarative deployment file 215. The declarative deployment file 215 may define a "desired state" of the overall system and thus may define various update configurations for deployment of updates to the various nodes of the system 200. In some examples, the declarative deployment file 215 is defined via a Kubernetes Custom Resource definition and may be managed at that custom resource (e.g., a custom Kubernetes API endpoint). A Kubernetes custom resource may support storage and retrieval of structured data, and the declarative deployment file 215 may function as a declarative API that defines the desired state of the Kubernetes system. The declarative deployment file 215 may include indications of system identifiers (realm identifiers), which may correspond to the logical single-tenant system stacks 245 that are to receive an update. The declarative deployment file 215 may also include indications of maintenance windows for updates. For example, particular tenants may prefer that their systems be updated (e.g., when downtime is required) during low customer traffic times. Thus, these maintenance windows may correspond to customer or tenant preferences. The declarative deployment file 215 may also define blackouts or moratoriums, during which various services may be inaccessible. In some examples the declarative deployment file 215 may indicate approved application and web server versions to be deployed, approved upgrade paths, and which realms and instances should be running which version of software and when. For example, the declarative deployment file 215 may include an identifier of a Docker image that includes the update information.

Accordingly, when the declarative deployment file 215 is merged, the declarative deployment file may be distributed to each of the nodes based on which nodes manage tenant systems that are specified in the declarative deployment file by the deployment manager 210. In some cases, the declarative deployment file is packaged as a Kubernetes helm chart and distributed or published to the nodes 220 via an endpoint, such as an Amazon S3 bucket. In some examples the deployment manger generates Spinnaker pipelines to distribute the packaged declarative deployment file 215.

Each of the nodes 220 may include a deployment component, which may be referred to as an operator, which is Kubernetes software extension. The operator may reference the packaged declarative deployment file 215 to determine a deployment schedule for the respective node 220. The deployment schedule may be dependent on the maintenance windows, the respective stacks 245 that the node services, etc. Further, when a stack 245 is being upgraded, the operator may determine whether the respective systems, such as the application server 235, is running an active process before deploying the update. Thus, using these techniques, the declarative deployment file 215 may support dynamic upgrades to various single tenant system stacks in a manner that reduces downtime, ensures that various constraints are satisfied, and reduces errors. As each node 220 may separately deploy the updates, the stacks for the respective nodes are upgraded in a manner that may not interfere with services at other nodes that may support stacks for the same tenants.

Various types of updates may be implemented and configured by the declarative deployment file 215. For example, a migration may depend on the systems being down. As such, a migration may stop an instance, update binaries, perform database migrations, and restart an instance. A hotfix may be less disruption than a migration. A hotfix may stop an instance, update the binaries, and start the instance again. A patch may not be disruptive and may patch partial jars available in the directory from which the system classpath is built, and may perform a rolling restart of the app servers of the instance. In some examples, the declarative deployment file 215 may indicate the type of update, and as such, the determined deployment schedule may depend on the update type. For a migration, the operator may push the update during the indicated maintenance window. However, for a patch, the operator may push the update at any time or when the systems are not actively running a process, for example.

Each of the logical single tenant system stacks 245 may include multiple instances, such as a test instance or a production instance. The test instance (e.g., a sandbox) may be used by the tenants to test various services against the systems of the logical single tenant system stacks 245. The production instance may support the live services such as the live web and app servers. Thus, various updates may be pushed to the test instances before the production instance such that the tenants may test the services. Accordingly, the declarative deployment file 215 may indicate which instance (test or production) that various updates are to receive the updates. As a result, the operator may determine the deployment schedule in accordance with the indicated instances. Since a test instance may not be affected by downtime, the operator may push updates to test instance without referencing an indicated maintenance window.

The repository for the declarative deployment file 215 may be validated to ensure proper structure and content of the updates to the declarative deployment file 215. The validations may be orchestrated via hooks to ensure that the comment message has a valid change case identifier in an approved status. The hook may ensure a successful validation build. The validation build may be automatically run via a multibranch pipeline job. The hook may check that the file adheres to a defined schema, that the instance reference in the file exist, the realms exit, that the target versions (of web and app servers) have been released (e.g., via an API), the referenced target versions have images that have been published (e.g., via an API). The hooks may also check that a valid upgrade is within a start window. The check may fail if the from date is 90 days in the past, for example. The hooks may also verify that any regular expressions are valid. If these checks are successful, then the pull request may be merged to the master branch, which triggers deployment of the file to the nodes 220.

Further, the operator at each node 220 may maintain a last known good version of each of the systems (e.g., web server, app server, database) in case of a failure during update deployment. For example, if an update fails due to some error condition, the operator may roll-back an update according to the maintained last known good version. Thus, the operator may maintain the last known good version for each logical single tenant system stack (e.g., for each tenant), rather than maintaining the last known good for the entire cluster. This may ensure that the roll-backs may be performed correctly in case of an error condition.

Figure 3:
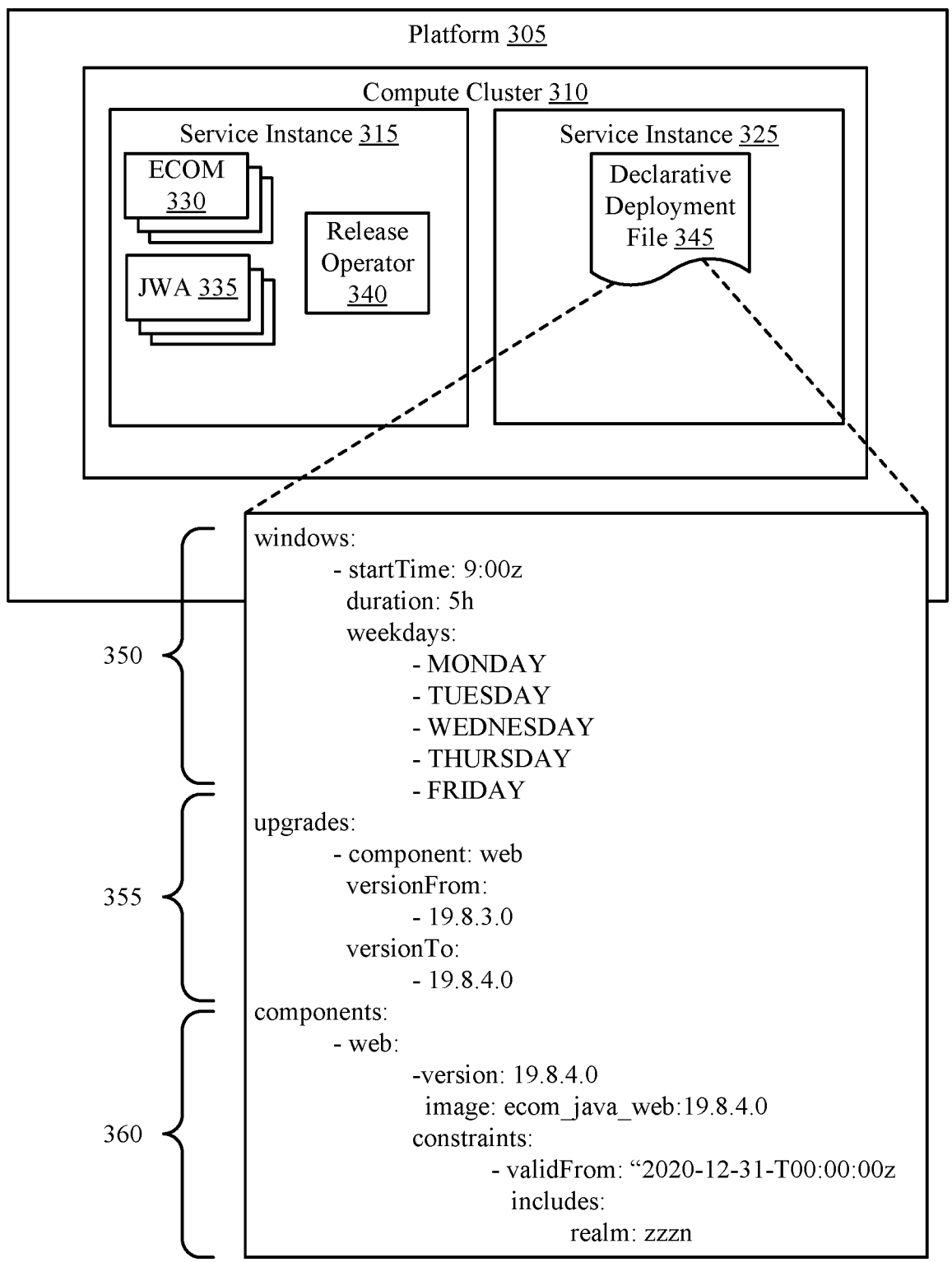
FIG. 3 illustrates an example of a system architecture that supports tenant declarative deployments in accordance with aspects of the present disclosure.

FIG. 3 illustrates an example of a system architecture 300 that supports tenant declarative deployments in accordance with aspects of the present disclosure. The system architecture 300 may include aspects of FIG. 1 and FIG. 2. The system architecture 300 includes a platform 305 which may be an example of cloud platform 115 of FIG. 1, and the platform 305 may support the various services and systems described herein, such as the compute cluster system, logical single-tenant system stacks, and the like. One or more compute clusters 310 may be supported by the platform 305. The compute cluster 310 may be an example of a node 220 (e.g., a Kubernetes node) as described with respect to FIG. 3.

The compute cluster 310 may be managed by a compute cluster management system, such as a master (e.g., node 205 of FIG. 1). The cluster 310 may support different service instances 315 and 325, which may allow for different pipelines to be used. For example, as a declarative deployment file 345 (which may be an example of a declarative deployment file 215 of FIG. 2) may be supported by a separate service instance 325, the declarative deployment file 345 may provide pipeline isolation from other portions of the infrastructure component, which may support deployment of the declarative deployment file 345 irrespective of any changes in other portions of the cluster 310. That is, since the separate instance 325 is provided for distribution of the declarative deployment file 345, the distribution has a unique path (e.g., a unique set of Spinnaker pipelines) to support production.

As illustrated, the declarative deployment file 345 provides constraints and configurations for deployment and may be used by a release operator 340 to determine a deployment schedule and implement updates in various systems (e.g., the app servers 330 and web servers 335) of the cluster 310 in accordance with the declarative deployment file 345. At 350, the declarative deployment file 345 defines windows for deploying an upgrade. For example, the upgrade is to start at 9:00 am on a weekday and may last 5 hours. At 355, the upgrades are defined. In this example, the web server component (e.g., web server 335) is to be upgraded from version 19.8.3.0 to version 19.8.4.0. As such, the operator 340 may determine whether the respective web server is running version 19.8.3.0 or later before deploying the upgrade. At 360, the declarative deployment file defines the version of the upgrade and provides a reference to the image location of the upgrade. Further constraints may also be defined such as a validity date and time and realm (system identifier) constraints. For example, only certain realms (e.g., stacks associated with certain tenants) may be upgraded according to this configuration. In some cases, the declarative deployment file 345 may indicate groupings of tenants, which may support deployment of updates to system associated with the tenants of the groups. The groupings of tenants may be specified using metadata associated with the tenants. The metadata may be stored as Kubernetes metadata defined in a tenant definition file or resource or in some other central metadata mapping service. As such, rather than referencing each tenant for update deployment, the declarative deployment file 345 may reference a tenant group.

Further, the release operator 340 may infer an upgrade type to determine whether the upgrade is a patch, migration, etc., and thus may control whether the release operator 340 performs various functions such as implementing the upgrade in the maintenance window (e.g., for an upgrade that may take services offline) or implement the upgrade at some other time (e.g., for a patch). The release operator 340 may infer the upgrade type by comparing source and target versions.

It should be understood that the declarative deployment file 345 may be in different formats than illustrated in FIG. 3. Further, the declarative deployment file 345 may also include other information, such an identification of instances. The instance may indicate whether the upgrade is to be deployed to a test instance (e.g., a sandbox) or a production group. If the upgrade is deployed at the test instance, a tenant user may be able to test various services using the test instance. As each operator 340 for each node may receive the declarative deployment file 345, the operator 340 may consume the file to determine the deployment schedule and the systems that it services that it is to upgrade.

In some cases, a user interface may be used to configure the declarative deployment file 345. For example, a release management user may select various identifiers, enter versions, select maintenance windows, etc. from a user interface, and the declarative deployment file 345 may be generated based on the selections at the user interface.

Figure 4:
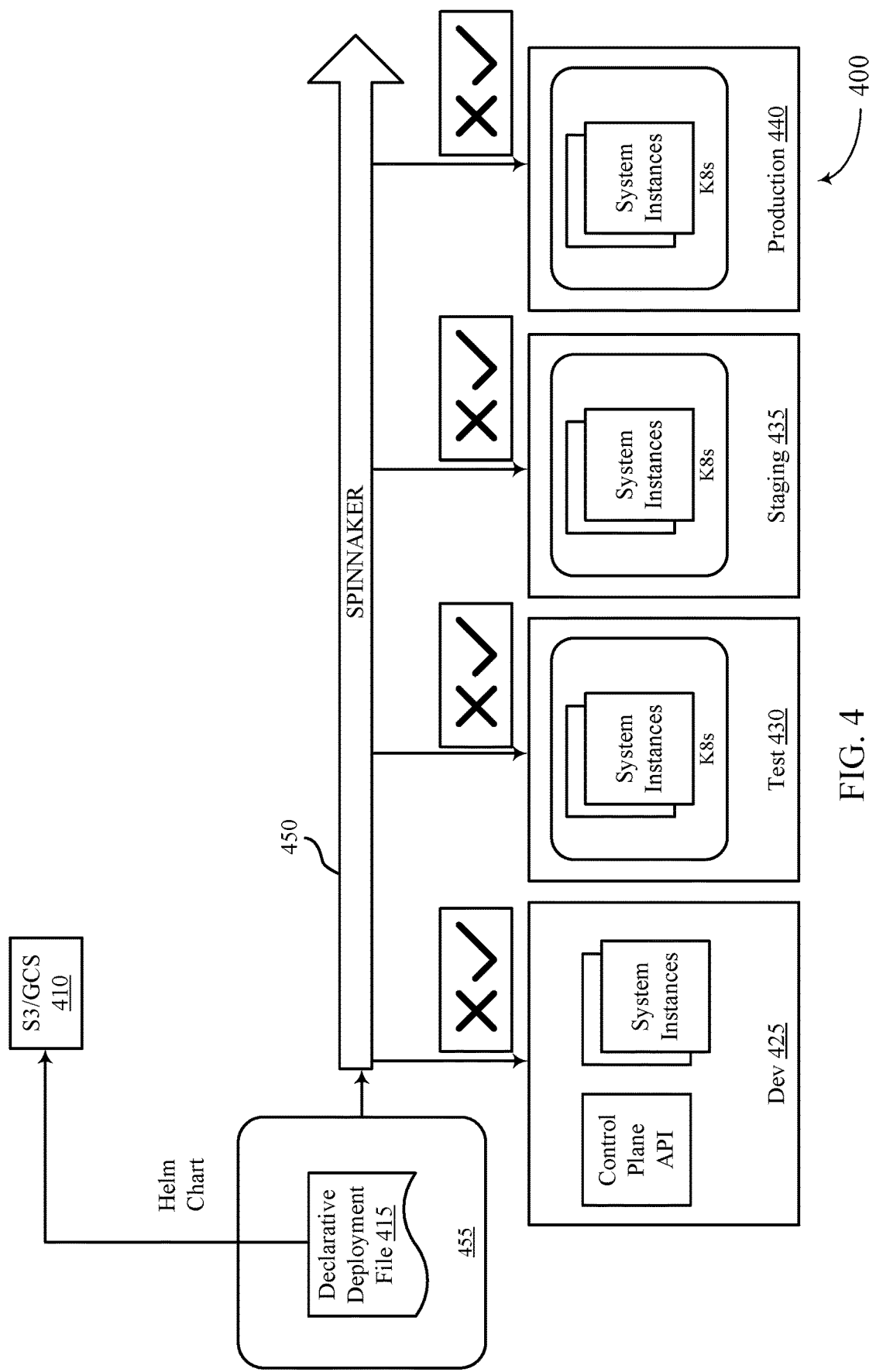
FIG. 4 illustrates an example of a process that supports tenant declarative deployments in accordance with aspects of the present disclosure.

FIG. 4 illustrates an example of a process 400 that supports tenant declarative deployments in accordance with aspects of the present disclosure. The process 400 illustrates components for deployment of a declarative deployment file 415. The process 400 includes a node 455, which may be an example of a Kubernetes master node as described herein. A release manager user may configure the declarative deployment file 415, which may be examples of the declarative deployment file as described with respect to FIGS. 1 through 3.

When an updated declarative deployment file 415 is merged, it may be converted to a helm chart and published to an Amazon S3 or Google cloud storage bucket 410. It should be understood that other object storage services are supported. In some cases. a manifest file may be referenced to identify which systems are to receive the declarative deployment 415. Further, the declarative deployment file 415 may be pushed to the compute clusters via pipeline 450 (e.g., a Spinnaker pipeline). The pipeline 450 identifies which systems, clusters, nodes, etc. are to receive the declarative deployment file 415, and pushes the declarative deployment file 415 through the deployment process. More particularly, the pipeline 450 may patch and update existing declarative deployment files for the clusters that are to receive the updated declarative deployment file 415.

The pipeline 450 may push the declarative deployment file though various environments such as a development environment 425, a test environment 430, a staging environment 435, and a production environment 440. At each stage, the pipeline 450 may confirm that the existing declarative deployment files were patched or updated correctly.

As a node receives the declarative file 415, the respective release operator may read the updated file and work to bring the various services, such as the web servers and app servers to the desired state according to the file 415. As the operator deploys the updates, the operator may test each instance to determine that updates are deployed without errors. For example, the operator may deploy the updates to a staging environment, and perform a test against the staging environment. The pipeline 450 may receive the test results and may terminate upon failure. In some cases, the test may include performing a checksum.

Figure 5:
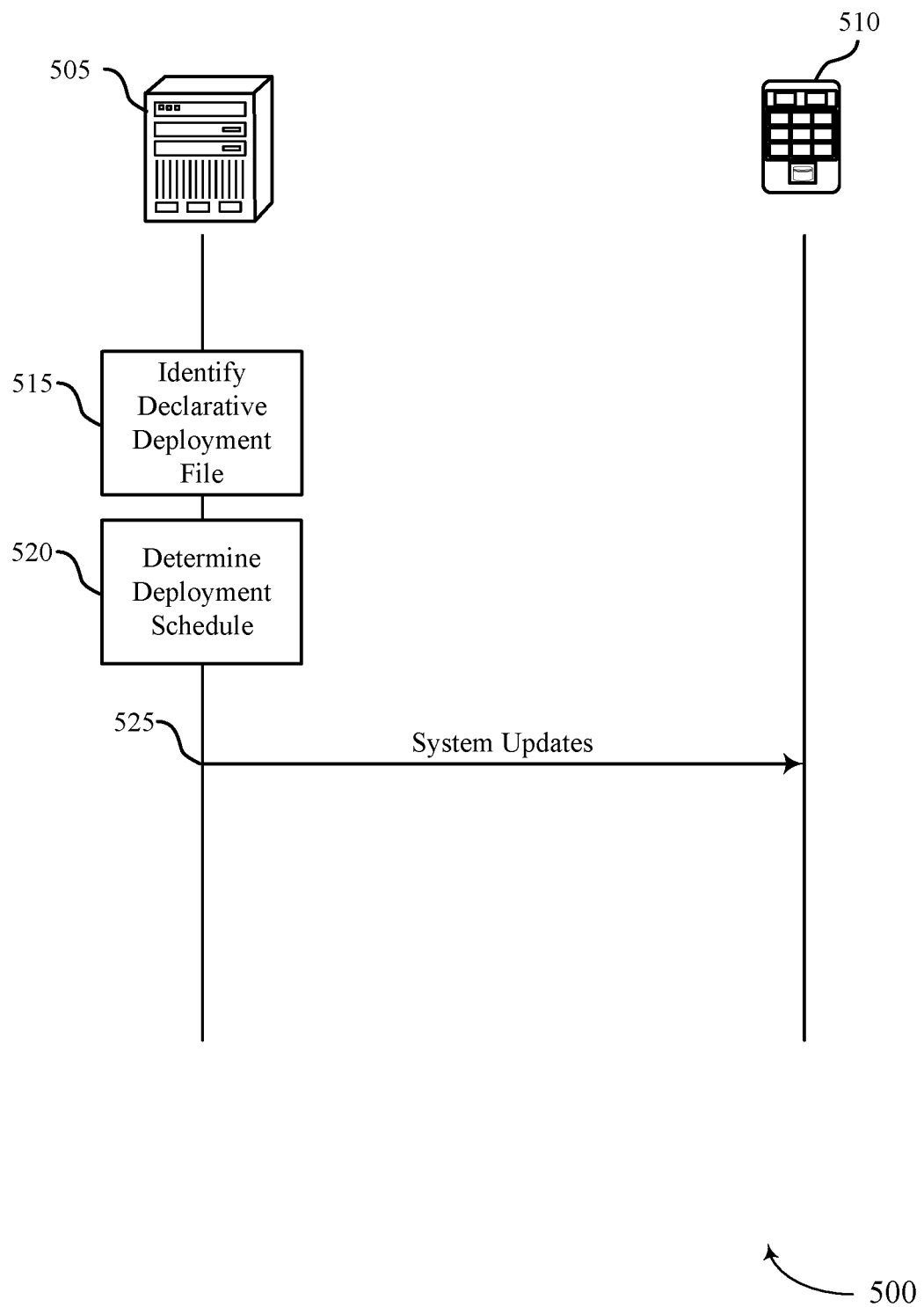
FIG. 5 illustrates an example of a process flow that supports tenant declarative deployments in accordance with aspects of the present disclosure.

FIG. 5 illustrates an example of a process flow 500 that supports tenant declarative deployments in accordance with aspects of the present disclosure. The process flow 500 includes a node 505 and a logical single-tenant system stack 510. The node 505 may be example of a Kubernetes node as described with respect to FIGS. 1 through 4, and the logical single-tenant system stack 510 may be an example of the corresponding components as described with respect to FIGS. 1 through 4.

At 515, the node 505 (e.g., an operator or deployment manager of the node) may identify a declarative deployment file defining a deployment configuration for one or more of a plurality of logical single-tenant system stacks supported by the compute container system. Each logical single-tenant system stack may include an application server component, a web server component, and a database. In some cases, the node 505 may identify the declarative deployment file based on the declarative deployment file being updated by a master node.

At 520, the node 505 may determine, based at least in part on the deployment configuration, a deployment schedule for implementing one or more system updates for the one or more of the plurality of logical single-tenant system stack. For example, the node 505 may determine when to update various systems based on maintenance windows defined in the declarative deployment file. The node 505 may also determine whether various systems are running requisite versions according to the declarative deployment file. The node 505 may also determine whether the updates are to be pushed to test instances or production instances.

At 525, the node 505 may implement the one or more system updates for the one or more of the plurality of logical single-tenant system stacks in accordance with the determined deployment schedule. This may include retrieving the updates according to images defined in the declarative deployment file and pushing the updates to the requisite systems (e.g., web servers, application servers, database instances) according to the determined schedule. Further, during implementation of the updates, the node 505 may determine whether the systems are running active processes before pushing the updates. In some cases, the node 505 may wait until the process is complete before pushing an update.

Figure 6:
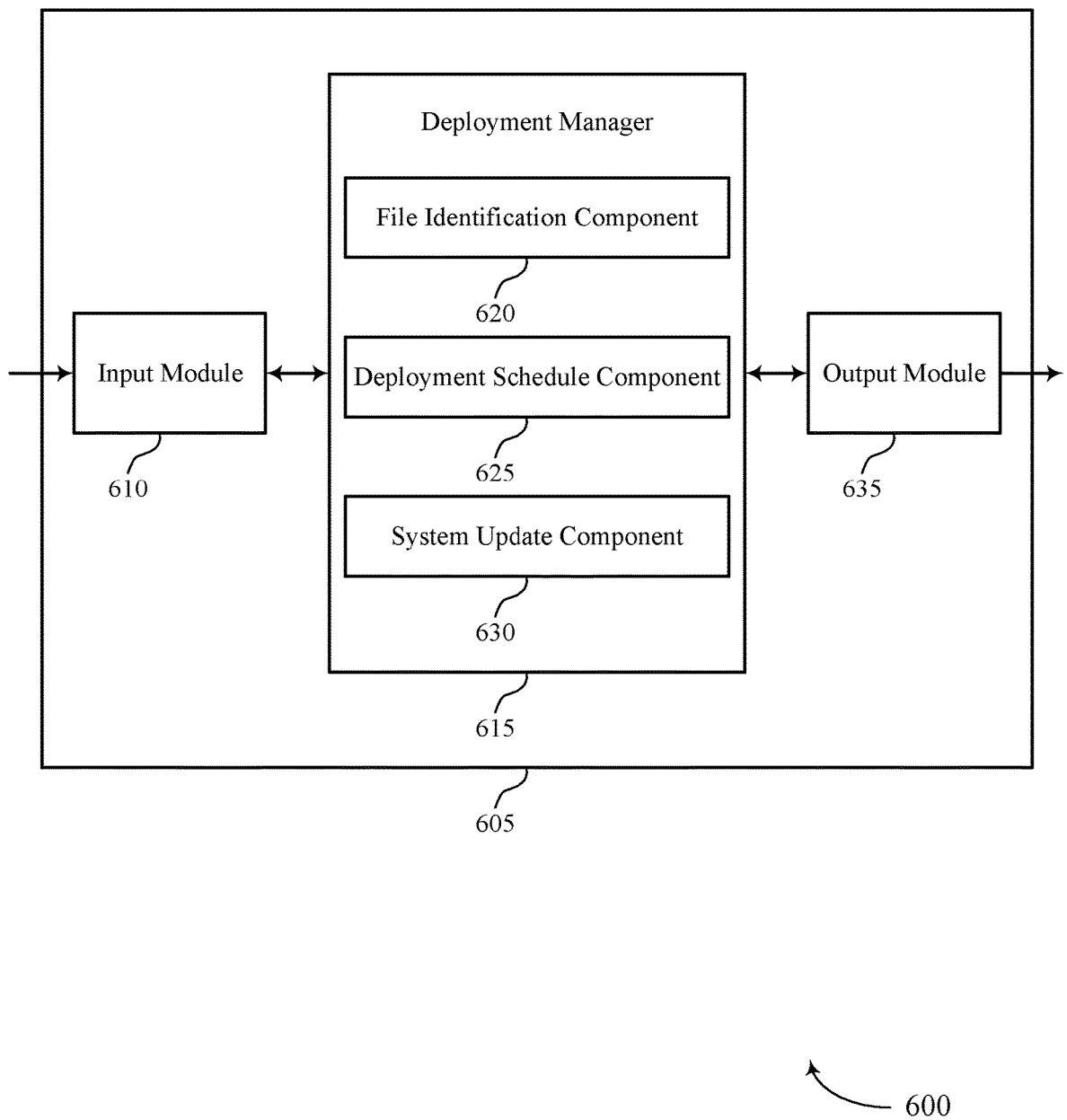
FIG. 6 shows a block diagram of an apparatus that supports tenant declarative deployments in accordance with aspects of the present disclosure.

FIG. 6 shows a block diagram 600 of an apparatus 605 that supports tenant declarative deployments in accordance with aspects of the present disclosure. The apparatus 605 may include an input module 610, a deployment manager 615, and an output module 635. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the deployment manager 615 to support data retention handling for data object stores. In some cases, the input module 610 may be a component of an input/output (I/O) controller 815 as described with reference to FIG. 8.

The deployment manager 615 may include a file identification component 620, a deployment schedule component 625, and a system update component 630. The deployment manager 615 may be an example of aspects of the deployment manager 705 or 810 described with reference to FIGS. 7 and 8.

The deployment manager 615 and/or at least some of its various sub-components may be implemented in hardware, software executed by a processor, firmware, or any combination thereof. If implemented in software executed by a processor, the functions of the deployment manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The deployment manager 615 and/or at least some of its various sub-components may be physically located at various positions, including being distributed such that portions of functions are implemented at different physical locations by one or more physical devices. In some examples, the deployment manager 615 and/or at least some of its various sub-components may be a separate and distinct component in accordance with various aspects of the present disclosure. In other examples, the deployment manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The file identification component 620 may identify, at a compute container system, a declarative deployment file defining a deployment configuration for one or more of a set of logical single-tenant system stacks supported by the compute container system, each logical single-tenant system stack including an application server component, a web server component, and a database.

The deployment schedule component 625 may determine, based on the deployment configuration, a deployment schedule for implementing one or more system updates for the one or more of the set of logical single-tenant system stacks.

The system update component 630 may implement the one or more system updates for the one or more of the set of logical single-tenant system stacks in accordance with the determined deployment schedule.

The output module 635 may manage output signals for the apparatus 605. For example, the output module 635 may receive signals from other components of the apparatus 605, such as the deployment manager 615, and may transmit these signals to other components or devices. In some specific examples, the output module 635 may transmit output signals for display in a user interface, for storage in a database or data store, for further processing at a server or server cluster, or for any other processes at any number of devices or systems. In some cases, the output module 635 may be a component of an I/O controller 815 as described with reference to FIG. 8.

Figure 7:
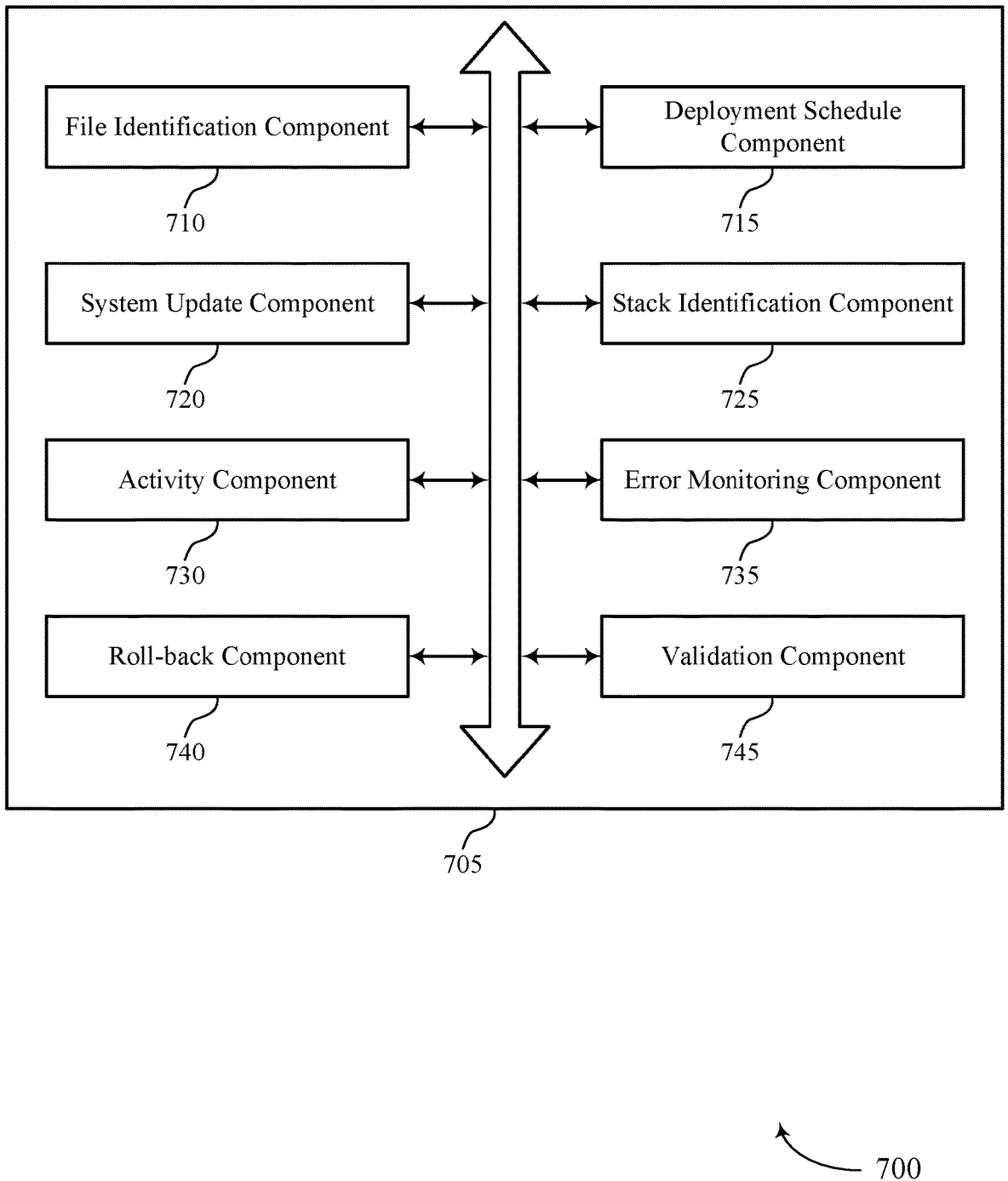
FIG. 7 shows a block diagram of a deployment manager that supports tenant declarative deployments in accordance with aspects of the present disclosure.

FIG. 7 shows a block diagram 700 of a deployment manager 705 that supports tenant declarative deployments in accordance with aspects of the present disclosure. The deployment manager 705 may be an example of aspects of a deployment manager 615 or a deployment manager 810 described herein. The deployment manager 705 may include a file identification component 710, a deployment schedule component 715, a system update component 720, a stack identification component 725, an activity component 730, an error monitoring component 735, a roll-back component 740, and a validation component 745. Each of these modules may communicate, directly or indirectly, with one another (e.g., via one or more buses).

The file identification component 710 may identify, at a compute container system, a declarative deployment file defining a deployment configuration for one or more of a set of logical single-tenant system stacks supported by the compute container system, each logical single-tenant system stack including an application server component, a web server component, and a database.

The deployment schedule component 715 may determine, based on the deployment configuration, a deployment schedule for implementing one or more system updates for the one or more of the set of logical single-tenant system stacks.

In some examples, the deployment schedule component 715 may determine that a current version of software executable in one or more of the set of logical single-tenant system stacks satisfies a software version criterion indicated in the declarative deployment file before implementing the one or more system updates.

In some examples, the deployment schedule component 715 may determine the deployment schedule for the one or more of the set of logical single-tenant system stacks in accordance with maintenance windows for the one or more of the set of logical single-tenant system stacks specified by the declarative deployment file.

The system update component 720 may implement the one or more system updates for the one or more of the set of logical single-tenant system stacks in accordance with the determined deployment schedule.

In some examples, the system update component 720 may implement the one or more system updates in a test environment or a production environment in the one or more of the set of logical single-tenant system stacks in accordance with the declarative deployment file.

The stack identification component 725 may determine the one or more of the set of logical single-tenant system stacks for implementing the one or more system updates based on a set of system identifiers included in the declarative deployment file, each system identifier associated with one of the set of logical single-tenant system stacks and a corresponding tenant. In some examples, the stack identification component 725 determines the one or more of the plurality of logical single-tenant system stacks for implementing the one or more system updates based at least in part on metadata associated with one or more tenants associated with the plurality of logical single-tenant system stacks, wherein the metadata indicates groupings of tenants.

The activity component 730 may determine that the application server component, the web server component, the database, or a combination thereof of a respective logical single-tenant system stack is not running an active process before implementing the one or more system updates on the respective logical single-tenant system stack.

The error monitoring component 735 may identify an error condition in during implementation of the one or more system updates.

The roll-back component 740 may update, based on identifying the error condition, the one or more of the set of logical single-tenant system stacks using last known good versions that are maintained in association with each of the one or more of the set of logical single-tenant system stacks.

The validation component 745 may validate the declarative deployment file before implementing the one or more system updates.

Figure 8:
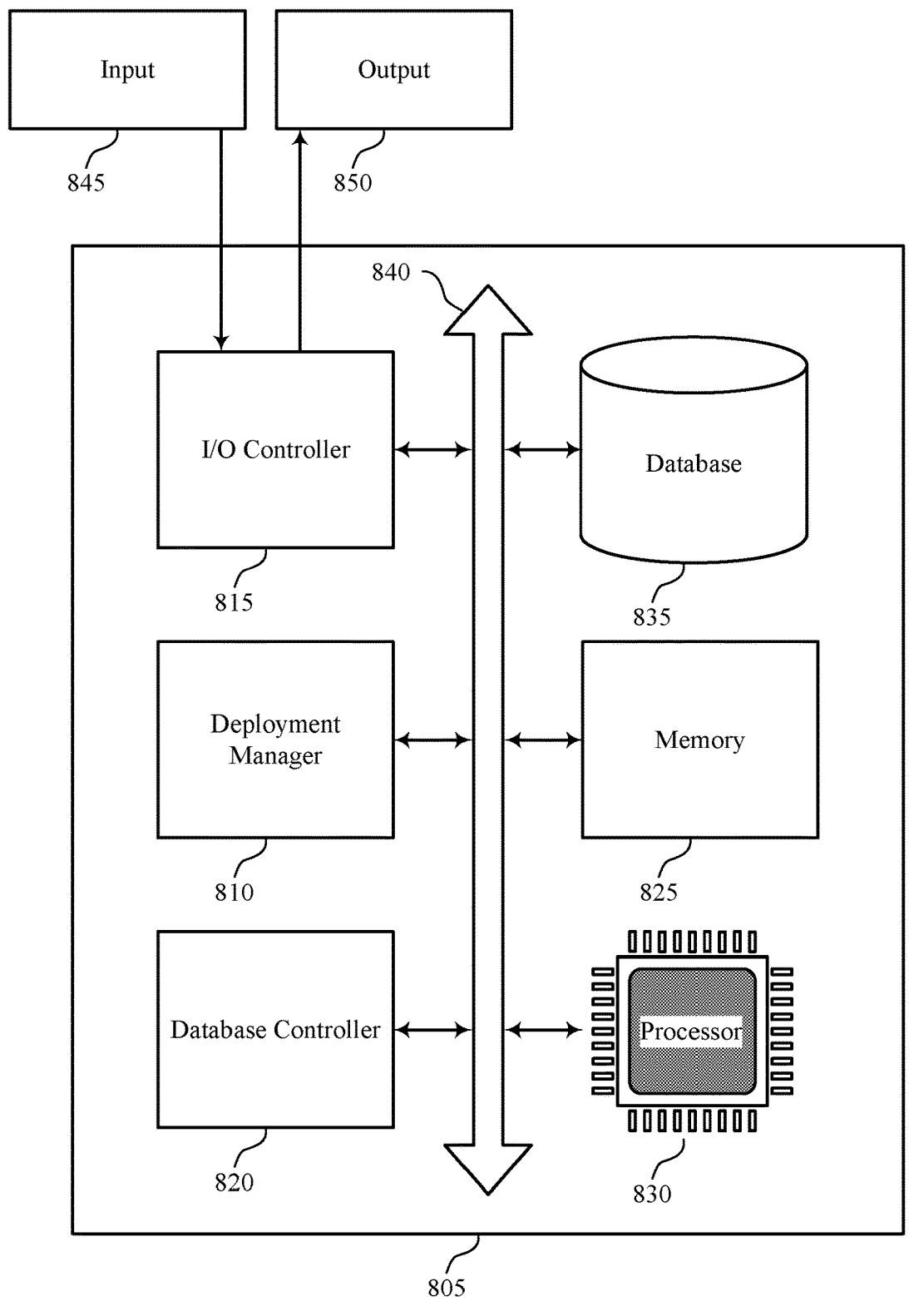
FIG. 8 shows a diagram of a system including a device that supports tenant declarative deployments in accordance with aspects of the present disclosure.

FIG. 8 shows a diagram of a system 800 including a device 805 that supports tenant declarative deployments in accordance with aspects of the present disclosure. The device 805 may be an example of or include the components of an application server or an apparatus 605 as described herein. The device 805 may include components for bi-directional data communications including components for transmitting and receiving communications, including a deployment manager 810, an I/O controller 815, a database controller 820, memory 825, a processor 830, and a database 835. These components may be in electronic communication via one or more buses (e.g., bus 840).

The deployment manager 810 may be an example of a deployment manager 615 or 705 as described herein. For example, the deployment manager 810 may perform any of the methods or processes described above with reference to FIGS. 6 and 7. In some cases, the deployment manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting tenant declarative deployments).

Figure 9:
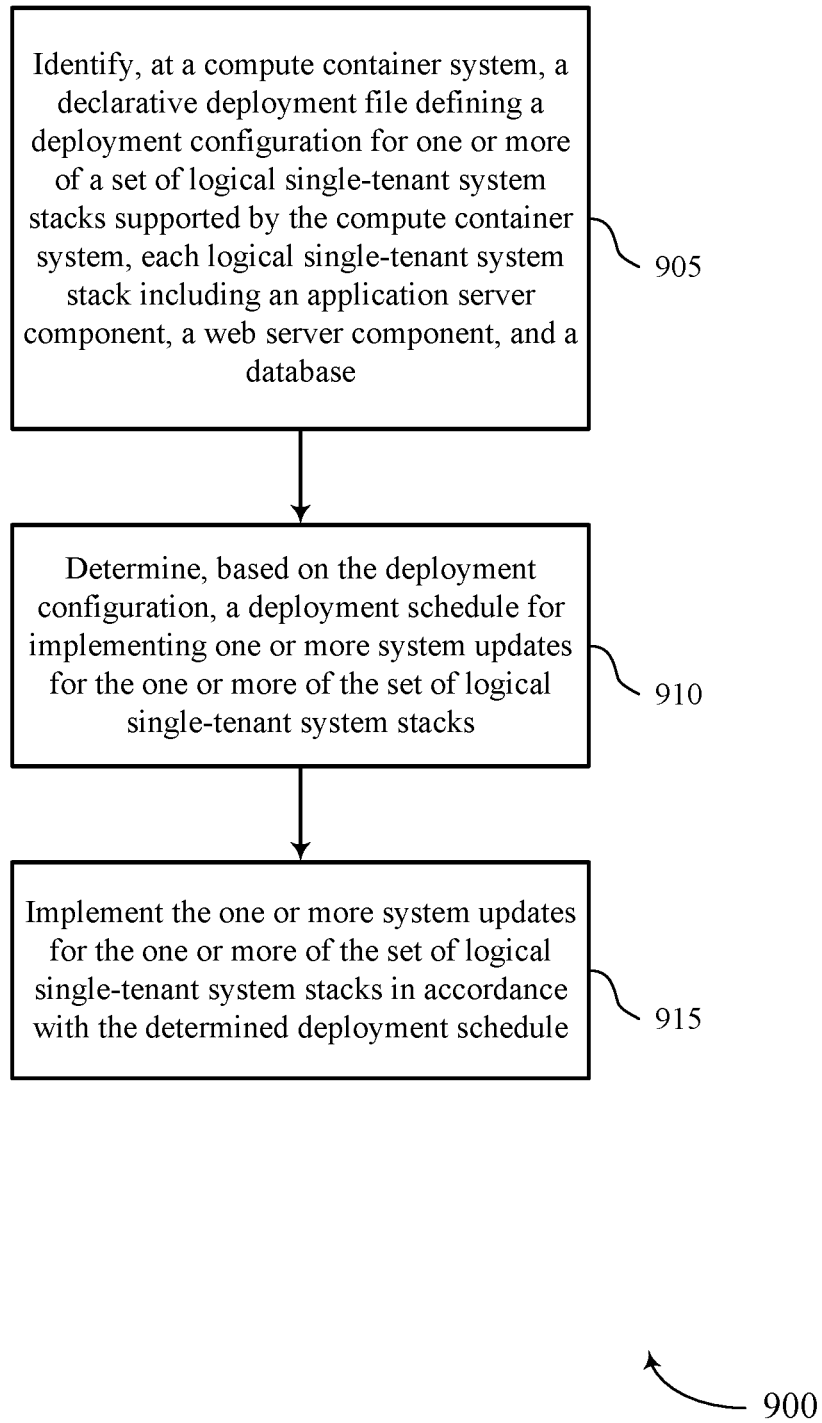
FIGS. 9 through 12 show flowcharts illustrating methods that support tenant declarative deployments in accordance with aspects of the present disclosure.

FIG. 9 shows a flowchart illustrating a method 900 that supports tenant declarative deployments in accordance with aspects of the present disclosure. The operations of method 900 may be implemented by an application server or its components as described herein. For example, the operations of method 900 may be performed by a deployment manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may identify, at a compute container system, a declarative deployment file defining a deployment configuration for one or more of a set of logical single-tenant system stacks supported by the compute container system, each logical single-tenant system stack including an application server component, a web server component, and a database. The operations of 905 may be performed according to the methods described herein. In some examples, aspects of the operations of 905 may be performed by a file identification component as described with reference to FIGS. 6 through 8.

At 910, the application server may determine, based on the deployment configuration, a deployment schedule for implementing one or more system updates for the one or more of the set of logical single-tenant system stacks. The operations of 910 may be performed according to the methods described herein. In some examples, aspects of the operations of 910 may be performed by a deployment schedule component as described with reference to FIGS. 6 through 8.

At 915, the application server may implement the one or more system updates for the one or more of the set of logical single-tenant system stacks in accordance with the determined deployment schedule. The operations of 915 may be performed according to the methods described herein. In some examples, aspects of the operations of 915 may be performed by a system update component as described with reference to FIGS. 6 through 8.

Figure 10:
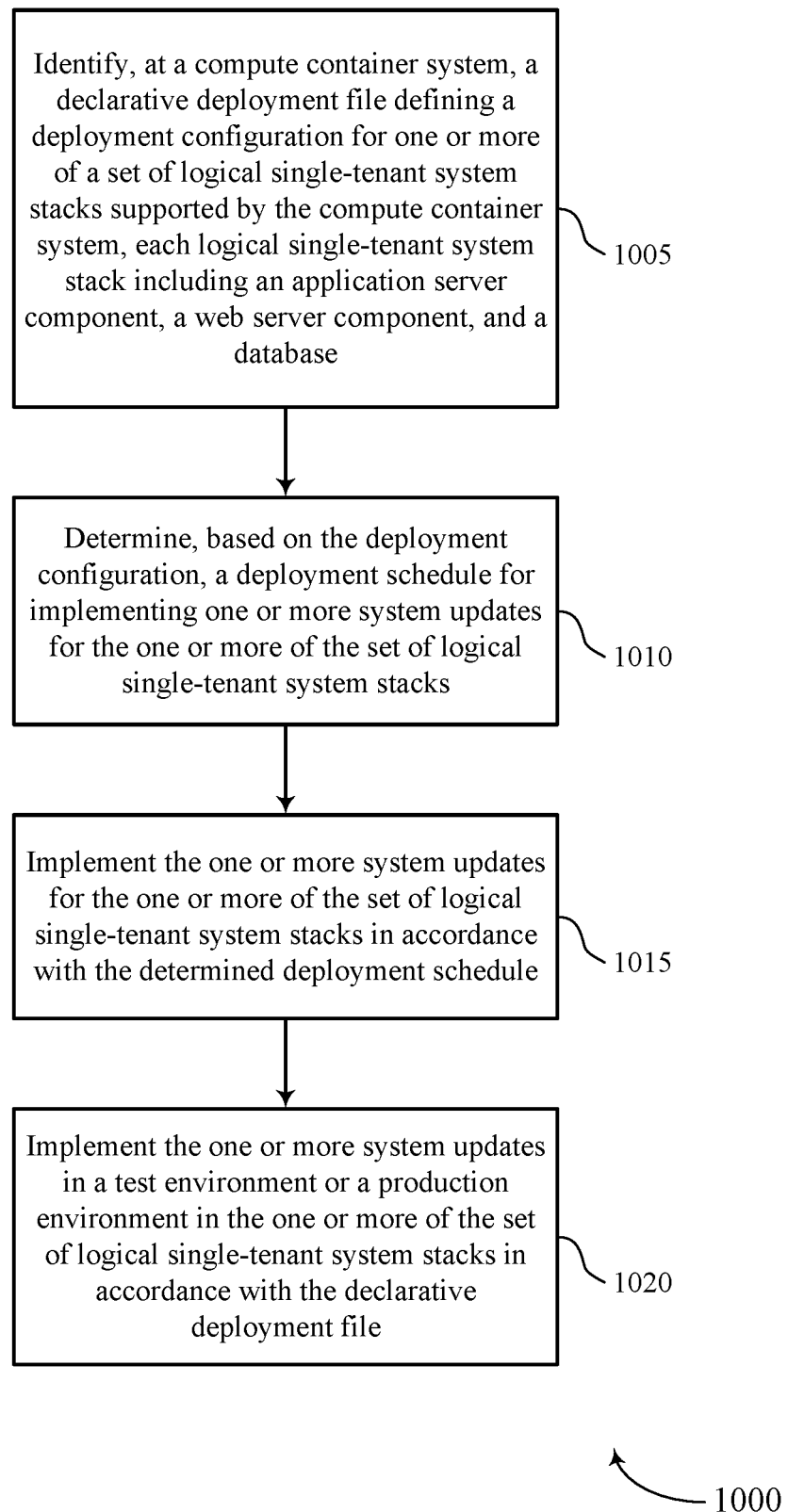

FIG. 10 shows a flowchart illustrating a method 1000 that supports tenant declarative deployments in accordance with aspects of the present disclosure. The operations of method 1000 may be implemented by an application server or its components as described herein. For example, the operations of method 1000 may be performed by a deployment manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may identify, at a compute container system, a declarative deployment file defining a deployment configuration for one or more of a set of logical single-tenant system stacks supported by the compute container system, each logical single-tenant system stack including an application server component, a web server component, and a database. The operations of 1005 may be performed according to the methods described herein. In some examples, aspects of the operations of 1005 may be performed by a file identification component as described with reference to FIGS. 6 through 8.

At 1010, the application server may determine, based on the deployment configuration, a deployment schedule for implementing one or more system updates for the one or more of the set of logical single-tenant system stacks. The operations of 1010 may be performed according to the methods described herein. In some examples, aspects of the operations of 1010 may be performed by a deployment schedule component as described with reference to FIGS. 6 through 8.

At 1015, the application server may implement the one or more system updates for the one or more of the set of logical single-tenant system stacks in accordance with the determined deployment schedule. The operations of 1015 may be performed according to the methods described herein. In some examples, aspects of the operations of 1015 may be performed by a system update component as described with reference to FIGS. 6 through 8.

At 1020, the application server may implement the one or more system updates in a test environment or a production environment in the one or more of the set of logical single-tenant system stacks in accordance with the declarative deployment file. The operations of 1020 may be performed according to the methods described herein. In some examples, aspects of the operations of 1020 may be performed by a system update component as described with reference to FIGS. 6 through 8.

Figure 11:
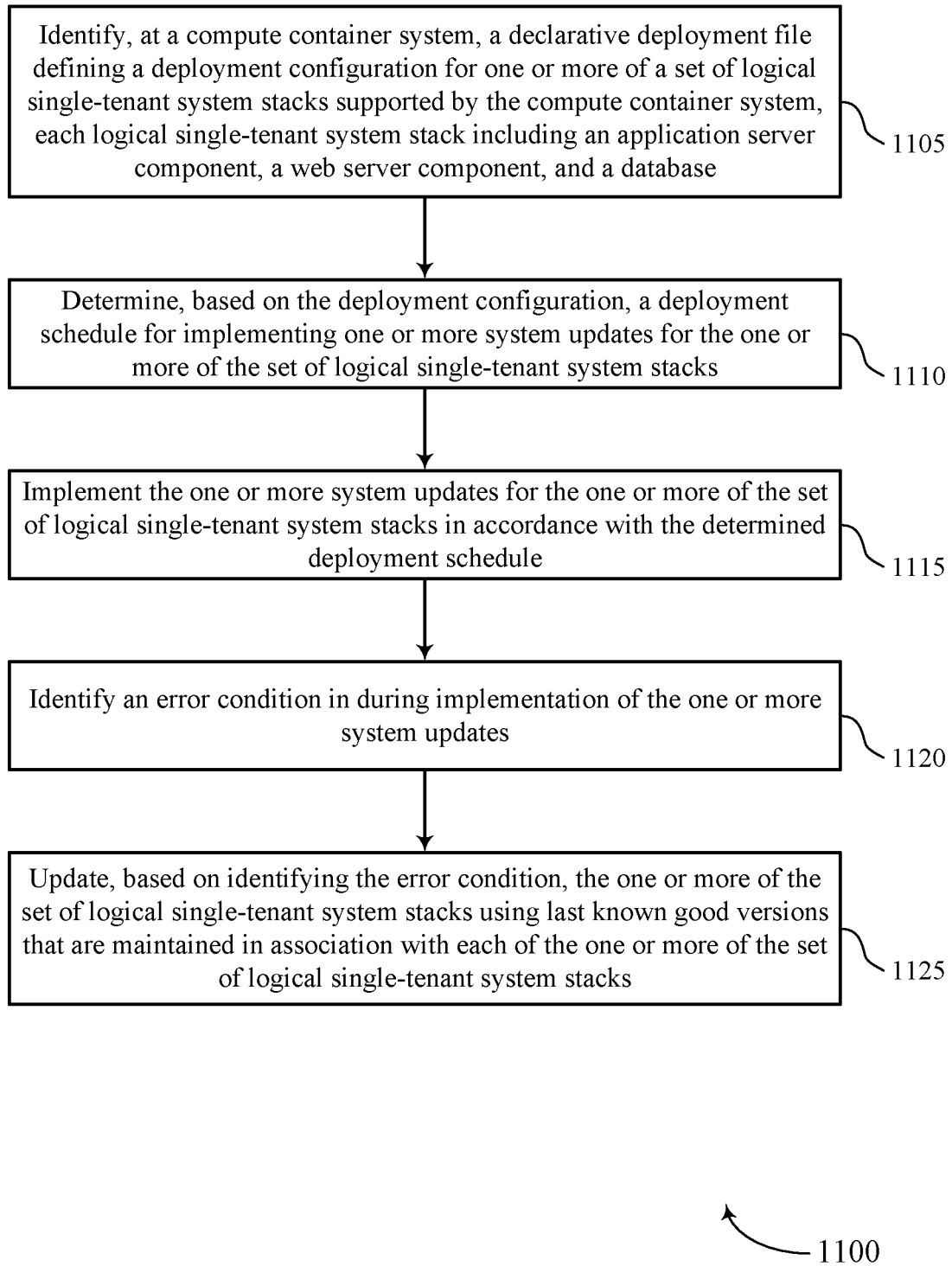

FIG. 11 shows a flowchart illustrating a method 1100 that supports tenant declarative deployments in accordance with aspects of the present disclosure. The operations of method 1100 may be implemented by an application server or its components as described herein. For example, the operations of method 1100 may be performed by a deployment manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may identify, at a compute container system, a declarative deployment file defining a deployment configuration for one or more of a set of logical single-tenant system stacks supported by the compute container system, each logical single-tenant system stack including an application server component, a web server component, and a database. The operations of 1105 may be performed according to the methods described herein. In some examples, aspects of the operations of 1105 may be performed by a file identification component as described with reference to FIGS. 6 through 8.

At 1110, the application server may determine, based on the deployment configuration, a deployment schedule for implementing one or more system updates for the one or more of the set of logical single-tenant system stacks. The operations of 1110 may be performed according to the methods described herein. In some examples, aspects of the operations of 1110 may be performed by a deployment schedule component as described with reference to FIGS. 6 through 8.

At 1115, the application server may implement the one or more system updates for the one or more of the set of logical single-tenant system stacks in accordance with the determined deployment schedule. The operations of 1115 may be performed according to the methods described herein. In some examples, aspects of the operations of 1115 may be performed by a system update component as described with reference to FIGS. 6 through 8.

At 1120, the application server may identify an error condition in during implementation of the one or more system updates. The operations of 1120 may be performed according to the methods described herein. In some examples, aspects of the operations of 1120 may be performed by an error monitoring component as described with reference to FIGS. 6 through 8.

At 1125, the application server may update, based on identifying the error condition, the one or more of the set of logical single-tenant system stacks using last known good versions that are maintained in association with each of the one or more of the set of logical single-tenant system stacks. The operations of 1125 may be performed according to the methods described herein. In some examples, aspects of the operations of 1125 may be performed by a roll-back component as described with reference to FIGS. 6 through 8.

Figure 12:
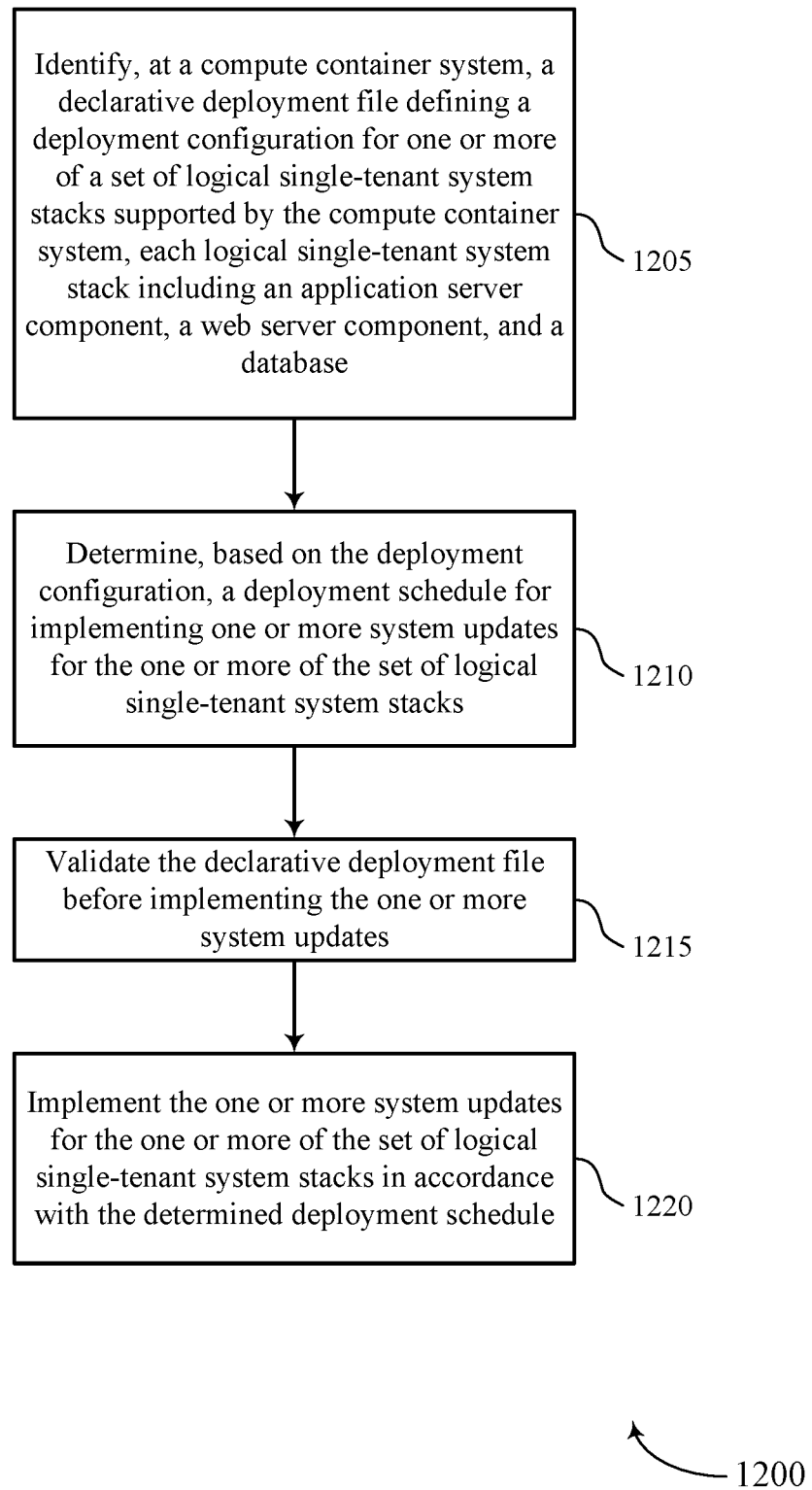

FIG. 12 shows a flowchart illustrating a method 1200 that supports tenant declarative deployments in accordance with aspects of the present disclosure. The operations of method 1200 may be implemented by an application server or its components as described herein. For example, the operations of method 1200 may be performed by a deployment manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1205, the application server may identify, at a compute container system, a declarative deployment file defining a deployment configuration for one or more of a set of logical single-tenant system stacks supported by the compute container system, each logical single-tenant system stack including an application server component, a web server component, and a database. The operations of 1205 may be performed according to the methods described herein. In some examples, aspects of the operations of 1205 may be performed by a file identification component as described with reference to FIGS. 6 through 8.

At 1210, the application server may determine, based on the deployment configuration, a deployment schedule for implementing one or more system updates for the one or more of the set of logical single-tenant system stacks. The operations of 1210 may be performed according to the methods described herein. In some examples, aspects of the operations of 1210 may be performed by a deployment schedule component as described with reference to FIGS. 6 through 8.

At 1215, the application server may validate the declarative deployment file before implementing the one or more system updates. The operations of 1215 may be performed according to the methods described herein. In some examples, aspects of the operations of 1215 may be performed by a validation component as described with reference to FIGS. 6 through 8.

At 1220, the application server may implement the one or more system updates for the one or more of the set of logical single-tenant system stacks in accordance with the determined deployment schedule. The operations of 1220 may be performed according to the methods described herein. In some examples, aspects of the operations of 1220 may be performed by a system update component as described with reference to FIGS. 6 through 8.

A method of software deployment is described. The method may include identifying, at a compute container system, a declarative deployment file defining a deployment configuration for one or more of a set of logical single-tenant system stacks supported by the compute container system, each logical single-tenant system stack including an application server component, a web server component, and a database, determining, based on the deployment configuration, a deployment schedule for implementing one or more system updates for the one or more of the set of logical single-tenant system stacks, and implementing the one or more system updates for the one or more of the set of logical single-tenant system stacks in accordance with the determined deployment schedule.

An apparatus for software deployment is described. The apparatus may include a processor, memory coupled with the processor, and instructions stored in the memory. The instructions may be executable by the processor to cause the apparatus to identify, at a compute container system, a declarative deployment file defining a deployment configuration for one or more of a set of logical single-tenant system stacks supported by the compute container system, each logical single-tenant system stack including an application server component, a web server component, and a database, determine, based on the deployment configuration, a deployment schedule for implementing one or more system updates for the one or more of the set of logical single-tenant system stacks, and implement the one or more system updates for the one or more of the set of logical single-tenant system stacks in accordance with the determined deployment schedule.

Another apparatus for software deployment is described. The apparatus may include means for identifying, at a compute container system, a declarative deployment file defining a deployment configuration for one or more of a set of logical single-tenant system stacks supported by the compute container system, each logical single-tenant system stack including an application server component, a web server component, and a database, determining, based on the deployment configuration, a deployment schedule for implementing one or more system updates for the one or more of the set of logical single-tenant system stacks, and implementing the one or more system updates for the one or more of the set of logical single-tenant system stacks in accordance with the determined deployment schedule.

A non-transitory computer-readable medium storing code for software deployment is described. The code may include instructions executable by a processor to identify, at a compute container system, a declarative deployment file defining a deployment configuration for one or more of a set of logical single-tenant system stacks supported by the compute container system, each logical single-tenant system stack including an application server component, a web server component, and a database, determine, based on the deployment configuration, a deployment schedule for implementing one or more system updates for the one or more of the set of logical single-tenant system stacks, and implement the one or more system updates for the one or more of the set of logical single-tenant system stacks in accordance with the determined deployment schedule.

Some examples of the method, apparatuses, and non-transitory computer-readable medium described herein may further include operations, features, means, or instructions for determining the one or more of the set of logical single-tenant system stacks for implementing the one or more system updates based on a set of system identifiers included in the declarative deployment file, each system identifier associated with one of the set of logical single-tenant system stacks and a corresponding tenant.

In some examples of the method, apparatuses, and non-transitory computer-readable medium described herein, implementing the one or more system updates may include operations, features, means, or instructions for determining that the application server component, the web server component, the database, or a combination thereof of a respective logical single-tenant system stack may be not running an active process before implementing the one or more system updates on the respective logical single-tenant system stack.

In some examples of the method, apparatuses, and non-transitory computer-readable medium described herein, implementing the one or more system updates may include operations, features, means, or instructions for implementing the one or more system updates in a test environment or a production environment in the one or more of the set of logical single-tenant system stacks in accordance with the declarative deployment file.

Some examples of the method, apparatuses, and non-transitory computer-readable medium described herein may further include operations, features, means, or instructions for identifying an error condition in during implementation of the one or more system updates, and updating, based on identifying the error condition, the one or more of the set of logical single-tenant system stacks using last known good versions that may be maintained in association with each of the one or more of the set of logical single-tenant system stacks.

Some examples of the method, apparatuses, and non-transitory computer-readable medium described herein may further include operations, features, means, or instructions for determining that a current version of software executable in one or more of the set of logical single-tenant system stacks satisfies a software version criterion indicated in the declarative deployment file before implementing the one or more system updates.

In some examples of the method, apparatuses, and non-transitory computer-readable medium described herein, determining the deployment schedule may include operations, features, means, or instructions for determining the deployment schedule for the one or more of the set of logical single-tenant system stacks in accordance with maintenance windows for the one or more of the set of logical single-tenant system stacks specified by the declarative deployment file.

Some examples of the method, apparatuses, and non-transitory computer-readable medium described herein may further include operations, features, means, or instructions for validating the declarative deployment file before implementing the one or more system updates.

Some examples of the method, apparatuses, and non-transitory computer-readable medium described herein may further include operations, features, means, or instructions for determining the one or more of the plurality of logical single-tenant system stacks for implementing the one or more system updates based at least in part on metadata associated with one or more tenants associated with the plurality of logical single-tenant system stacks, where the metadata indicates groupings of tenants.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for software deployment, comprising:

identifying, at a compute container system, a declarative deployment file defining a deployment configuration for at least two logical single-tenant system stacks of a plurality of logical single-tenant system stacks supported by the compute container system, each logical single-tenant system stack of the plurality of logical single-tenant system stacks including an application server component, a web server component, and a database corresponding to a single tenant of a plurality of tenants supported by the compute container system;

determining, based at least in part on the deployment configuration, a deployment schedule for implementing one or more system updates for the at least two logical single-tenant system stacks; and implementing the one or more system updates for the at least two logical single tenant system stacks in accordance with the determined deployment schedule.

2. The method of claim 1, further comprising:

determining the at least two logical single-tenant system stacks for implementing the one or more system updates based at least in part on a set of system identifiers included in the declarative deployment file, each system identifier associated with one of the plurality of logical single-tenant system stacks and a corresponding tenant.

3. The method of claim 1, wherein implementing the one or more system updates comprises:

determining that the application server component, the web server component, the database, or a combination thereof of a respective logical single-tenant system stack is not running an active process before implementing the one or more system updates on the respective logical single-tenant system stack.

4. The method of claim 1, wherein implementing the one or more system updates comprises:

implementing the one or more system updates in a test environment or a production environment in the at least two logical single-tenant system stacks in accordance with the declarative deployment file.

5. The method of claim 1, further comprising:

identifying an error condition during implementation of the one or more system updates; and updating, based at least in part on identifying the error condition, the at least two logical single-tenant system stacks using last known good versions that are maintained in association with each of the at least two logical single-tenant system stacks.

6. The method of claim 1, further comprising:

determining that a current version of software executable in the at least two logical single-tenant system stacks satisfies a software version criterion indicated in the declarative deployment file before implementing the one or more system updates.

7. The method of claim 1, wherein determining the deployment schedule comprises:

determining the deployment schedule for the at least two logical single-tenant system stacks in accordance with maintenance windows for the at least two logical single-tenant system stacks specified by the declarative deployment file.

8. The method of claim 1, further comprising:

validating the declarative deployment file before implementing the one or more system updates.

9. The method of claim 1, further comprising:

determining the at least two logical single-tenant system stacks for implementing the one or more system updates based at least in part on metadata associated with one or more tenants associated with the plurality of logical single-tenant system stacks, wherein the metadata indicates groupings of tenants.

10. An apparatus for software deployment, comprising:

a processor, memory coupled with the processor; and instructions stored in the memory and executable by the processor to cause the apparatus to:

identify, at a compute container system, a declarative deployment file defining a deployment configuration for at least two logical single-tenant system stacks of a plurality of logical single-tenant system stacks supported by the compute container system, each logical single-tenant system stack of the plurality of logical single-tenant system stacks including an application server component, a web server component, and a database corresponding to a single tenant of a plurality of tenants supported by the compute container system;

determine, based at least in part on the deployment configuration, a deployment schedule for implementing one or more system updates for the at least two logical single-tenant system stacks; and implement the one or more system updates for the at least two logical single tenant system stacks in accordance with the determined deployment schedule.

11. The apparatus of claim 10, wherein the instructions are further executable by the processor to cause the apparatus to:

determine the at least two logical single-tenant system stacks for implementing the one or more system updates based at least in part on a set of system identifiers included in the declarative deployment file, each system identifier associated with one of the plurality of logical single-tenant system stacks and a corresponding tenant.

12. The apparatus of claim 10, wherein the instructions to implement the one or more system updates are executable by the processor to cause the apparatus to:

determine that the application server component, the web server component, the database, or a combination thereof of a respective logical single-tenant system stack is not running an active process before implementing the one or more system updates on the respective logical single-tenant system stack.

13. The apparatus of claim 10, wherein the instructions to implement the one or more system updates are executable by the processor to cause the apparatus to:

implement the one or more system updates in a test environment or a production environment in the at least two logical single-tenant system stacks in accordance with the declarative deployment file.

14. The apparatus of claim 10, wherein the instructions are further executable by the processor to cause the apparatus to:

identify an error condition during implementation of the one or more system updates; and update, based at least in part on identifying the error condition, the at least two logical single-tenant system stacks using last known good versions that are maintained in association with each of the at least two logical single-tenant system stacks.

15. The apparatus of claim 10, wherein the instructions are further executable by the processor to cause the apparatus to:
  determine that a current version of software executable in the at least two logical single-tenant system stacks satisfies a software version criterion indicated in the declarative deployment file before implementing the one or more system updates.

16. A non-transitory computer-readable medium storing code for software deployment, the code comprising instructions executable by a processor to:
  identify, at a compute container system, a declarative deployment file defining a deployment configuration for at least two logical single-tenant system stacks of a plurality of logical single-tenant system stacks supported by the compute container system, each logical single-tenant system stack of the plurality of logical single-tenant system stacks including an application server component, a web server component, and a database corresponding to a single tenant of a plurality of tenants supported by the compute container system;
  determine, based at least in part on the deployment configuration, a deployment schedule for implementing one or more system updates for the at least two logical single-tenant system stacks; and
  implement the one or more system updates for the at least two logical single tenant system stacks in accordance with the determined deployment schedule.

17. The non-transitory computer-readable medium of claim 16, wherein the instructions are further executable to:
  determine the at least two logical single-tenant system stacks for implementing the one or more system updates based at least in part on a set of system identifiers included in the declarative deployment file, each system identifier associated with one of the plurality of logical single-tenant system stacks and a corresponding tenant.

18. The non-transitory computer-readable medium of claim 16, wherein the instructions to implement the one or more system updates are executable to:
  determine that the application server component, the web server component, the database, or a combination thereof of a respective logical single-tenant system stack is not running an active process before implementing the one or more system updates on the respective logical single-tenant system stack.

19. The non-transitory computer-readable medium of claim 16, wherein the instructions to implement the one or more system updates are executable to:
  implement the one or more system updates in a test environment or a production environment in the at least two logical single-tenant system stacks in accordance with the declarative deployment file.

20. The non-transitory computer-readable medium of claim 16, wherein the instructions are further executable to:
  identify an error condition during implementation of the one or more system updates; and
  update, based at least in part on identifying the error condition, the at least two logical single-tenant system stacks using last known good versions that are maintained in association with each of the at least two logical single-tenant system stacks.

* * * * *